US012425825B2

(12) United States Patent
Aftab et al.

(10) Patent No.: US 12,425,825 B2
(45) Date of Patent: Sep. 23, 2025

(54) ADAPTING RADIO ACCESS NETWORK COVERAGE FOR LOCATION-BASED ALERTS

(71) Applicant: AT&T Intellectual Property I, L.P., Atlanta, GA (US)

(72) Inventors: Anwar Syed Aftab, Budd Lake, NJ (US); Manoop Talasila, Branchburg, NJ (US); Lorraine Welch, Easton, PA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 668 days.

(21) Appl. No.: 17/653,915

(22) Filed: Mar. 8, 2022

(65) Prior Publication Data

US 2023/0292097 A1    Sep. 14, 2023

(51) Int. Cl.
  *H04W 4/90*     (2018.01)
  *H04H 20/59*    (2008.01)
  *H04H 20/71*    (2008.01)
  *H04W 4/021*    (2018.01)
  *H04W 4/06*     (2009.01)
  *H04W 4/12*     (2009.01)
  *H04W 64/00*    (2009.01)

(52) U.S. Cl.
  CPC ............. *H04W 4/90* (2018.02); *H04H 20/59* (2013.01); *H04H 20/71* (2013.01); *H04W 4/06* (2013.01); *H04W 64/003* (2013.01)

(58) Field of Classification Search
  None
  See application file for complete search history.

(56) References Cited

U.S. PATENT DOCUMENTS

| | | | | |
|---|---|---|---|---|
| 8,639,212 | B1 * | 1/2014 | Sennett | H04W 16/26 455/457 |
| 9,398,619 | B1 * | 7/2016 | Sennett | H04W 4/90 |
| 2009/0247111 | A1 * | 10/2009 | Sennett | H04W 76/50 455/404.1 |
| 2010/0075626 | A1 * | 3/2010 | Titus | H04W 76/50 455/404.1 |
| 2014/0032114 | A1 * | 1/2014 | Titus | G01C 21/3694 340/539.22 |
| 2015/0201316 | A1 * | 7/2015 | Khatibi | H04W 4/90 455/404.2 |
| 2018/0276977 | A1 * | 9/2018 | Berry | G08B 27/006 |
| 2018/0302744 | A1 * | 10/2018 | Raj | H04W 4/12 |
| 2019/0246260 | A1 * | 8/2019 | Edge | H04H 60/51 |

FOREIGN PATENT DOCUMENTS

CN        111448810 A  *  7/2020  ........... G08B 27/006

* cited by examiner

Primary Examiner — Pablo N Tran

(57) ABSTRACT

The described technology is generally directed towards an adapting radio access network coverage for location-based alerts. A group of cells and/or cell sectors can be selected for sending an alert, according to selection techniques described herein. The selection techniques can provide a target level of cellular coverage for a geographic area, while avoiding over-inclusion of cells and consequent dissemination of alerts to subscribers outside the geographic area. The target level of coverage can comprise a desired amount of service overlap, to achieve a corresponding level of confidence that subscribers within the geographic area will receive an alert. The selection techniques can furthermore close identified coverage gaps within the geographic area.

20 Claims, 10 Drawing Sheets

ADAPTING RADIO ACCESS NETWORK COVERAGE FOR LOCATION-BASED ALERTS

TECHNICAL FIELD

The subject application is related to cellular communication networks, and more particularly, to deploying alerts to user equipment via cellular communication networks.

BACKGROUND

Cellular service providers, such as AT&T Corporation and others, are responsible for sending wireless emergency alerts to their subscribers. Example alerts can comprise presidential alerts, amber alerts, child abduction emergencies, coastal flood warnings, flash flood warnings, high wind warnings, tornado warnings, earthquake warnings, winter storm warnings, etc.

Many alerts pertain to particular geographic areas, and such alerts are preferably are not sent to subscribers outside the relevant geographic area. For example, an alert regarding a road closure due to an accident is highly relevant to commuters in the area, but not relevant to other subscribers who are too far away to be affected by the closure.

In an example alert scenario, a government agency, such as the Federal Emergency Management Agency (FEMA), may identify an emergency that requires an alert. The government agency may provide the alert information and the affected area to cellular service providers. The cellular service providers are tasked with sending the alert information to subscribers in the affected area. Cellular service providers' alert systems are occasionally audited, and cellular service providers can be penalized for failure to send the alert to at least a predefined percentage, e.g., 90%, of their subscribers in the affected area.

The above-described background is merely intended to provide a contextual overview of some current issues and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
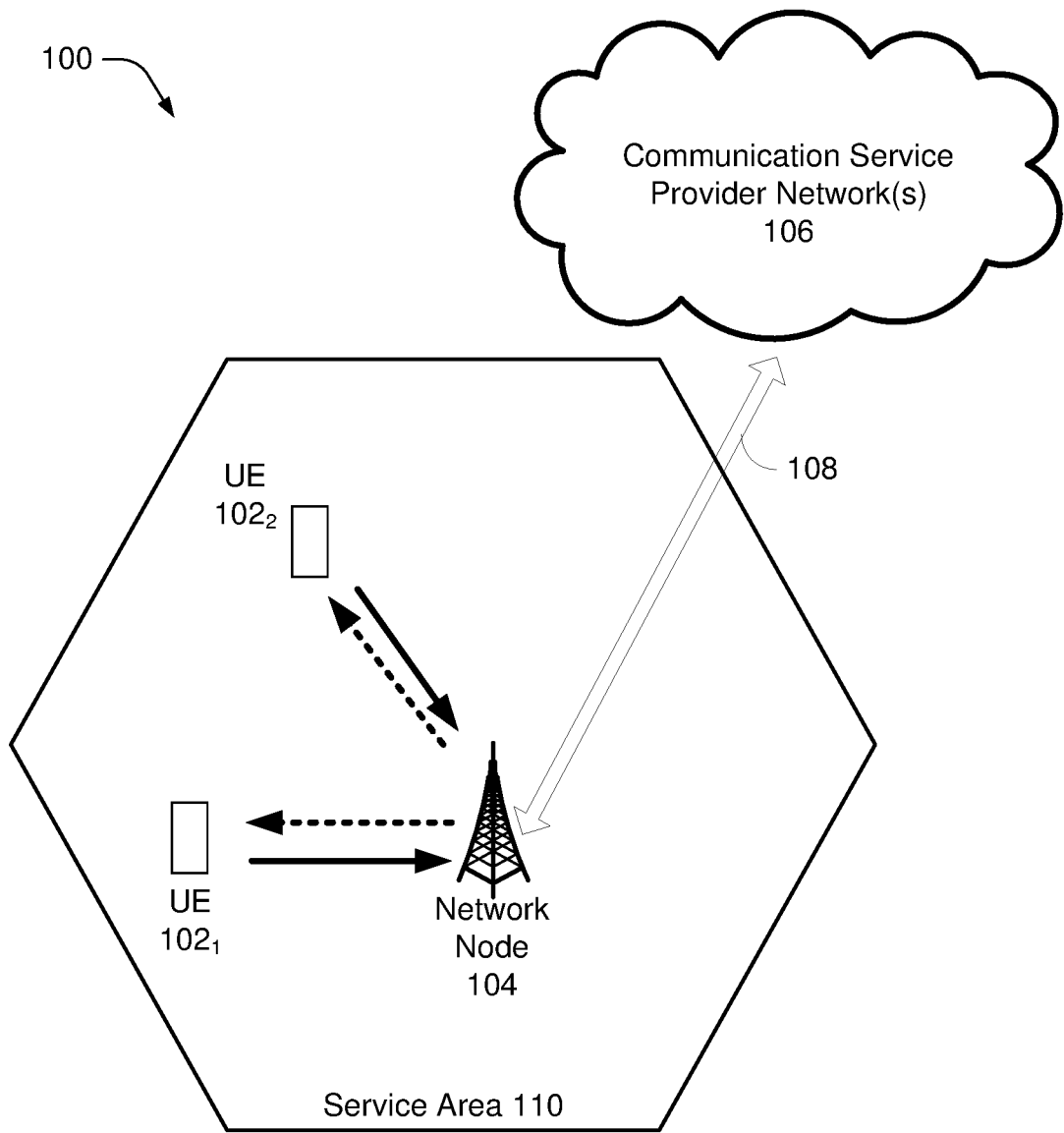
FIG. 1 illustrates an example wireless communication system, in accordance with various aspects and embodiments of the subject disclosure.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details, and without applying to any particular networked environment or standard.

One or more aspects of the technology described herein are generally directed towards adapting radio access network coverage for location-based alerts. A group of cells and/or cell sectors can be selected for sending an alert, according to selection techniques described herein. The selection techniques can provide a target level of cellular coverage for a geographic area, while avoiding over-inclusion of cells and consequent dissemination of alerts to subscribers outside the geographic area. The target level of coverage can comprise a desired amount of service overlap, to achieve a corresponding level of confidence that subscribers within the geographic area will receive an alert. The selection techniques can furthermore close identified coverage gaps within the geographic area. Further aspects and embodiments of this disclosure are described in detail below.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," "subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," "BS transceiver," "BS device," "cell site," "cell site device," "gNode B (gNB)," "evolved Node B (eNode B, eNB)," "home Node B (HNB)" and the like, refer to wireless network components or appliances that transmit and/or receive data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

It should be noted that although various aspects and embodiments have been described herein in the context of 4G, 5G, or other next generation networks, the disclosed aspects are not limited to a 4G or 5G implementation, and/or other network next generation implementations, as the techniques can also be applied, for example, in third generation (3G), or other wireless systems. In this regard, aspects or features of the disclosed embodiments can be exploited in substantially any wireless communication technology. Such wireless communication technologies can include universal mobile telecommunications system (UMTS), global system for mobile communication (GSM), code division multiple access (CDMA), wideband CDMA (WCMDA), CDMA2000, time division multiple access (TDMA), frequency division multiple access (FDMA), multi-carrier CDMA (MC-CDMA), single-carrier CDMA (SC-CDMA), single-carrier FDMA (SC-FDMA), orthogonal frequency division multiplexing (OFDM), discrete Fourier transform spread OFDM (DFT-spread OFDM), filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM (CP-OFDM), resource-block-filtered OFDM, wireless fidelity (Wi-Fi), worldwide interoperability for microwave access (WiMAX), wireless local area network (WLAN), general packet radio service (GPRS), enhanced GPRS, third generation partnership project (3GPP), long term evolution (LTE), LTE frequency division duplex (FDD), time division duplex (TDD), 5G, third generation partnership project 2 (3GPP2), ultra mobile broadband (UMB), high speed packet access (HSPA), evolved high speed packet access (HSPA+), high-speed downlink packet access (HSDPA), high-speed uplink packet access (HSUPA), Zigbee, or another institute of electrical and electronics engineers (IEEE) 802.12 technology. In this regard, all or substantially all aspects disclosed herein can be exploited in legacy telecommunication technologies.

FIG. 1 illustrates a non-limiting example of a wireless communication system 100 which can be used in connection with at least some embodiments of the subject disclosure. In one or more embodiments, system 100 can comprise one or more user equipment UEs 102₁, 102₂, referred to collectively as UEs 102, a network node 104 that supports cellular communications in a service area 110, also known as a cell, and communication service provider network(s) 106.

The non-limiting term "user equipment" can refer to any type of device that can communicate with a network node 104 in a cellular or mobile communication system 100. UEs 102 can have one or more antenna panels having vertical and horizontal elements. Examples of UEs 102 comprise target devices, device to device (D2D) UEs, machine type UEs or UEs capable of machine to machine (M2M) communications, personal digital assistants (PDAs), tablets, mobile terminals, smart phones, laptop mounted equipment (LME), universal serial bus (USB) dongles enabled for mobile communications, computers having mobile capabilities, mobile devices such as cellular phones, laptops having laptop embedded equipment (LEE, such as a mobile broadband adapter), tablet computers having mobile broadband adapters, wearable devices, virtual reality (VR) devices, heads-up display (HUD) devices, smart cars, machine-type communication (MTC) devices, augmented reality head mounted displays, and the like. UEs 102 can also comprise IOT devices that communicate wirelessly.

In various embodiments, system 100 comprises communication service provider network(s) 106 serviced by one or more wireless communication network providers. Communication service provider network(s) 106 can comprise a "core network". In example embodiments, UEs 102 can be communicatively coupled to the communication service provider network(s) 106 via network node 104. The network node 104 (e.g., network node device) can communicate with UEs 102, thus providing connectivity between the UEs 102 and the wider cellular network. The UEs 102 can send transmission type recommendation data to the network node 104. The transmission type recommendation data can comprise a recommendation to transmit data via a closed loop multiple input multiple output (MIMO) mode and/or a rank-1 precoder mode.

A network node 104 can have a cabinet and other protected enclosures, computing devices, an antenna mast, and multiple antennas for performing various transmission operations (e.g., MIMO operations) and for directing/steering signal beams. Network node 104 can comprise one or more base station devices which implement features of the network node 104. Network nodes can serve several cells, depending on the configuration and type of antenna. In example embodiments, UEs 102 can send and/or receive communication data via a wireless link to the network node 104. The dashed arrow lines from the network node 104 to the UEs 102 represent downlink (DL) communications to the UEs 102. The solid arrow lines from the UEs 102 to the network node 104 represent uplink (UL) communications.

Communication service provider networks 106 can facilitate providing wireless communication services to UEs 102 via the network node 104 and/or various additional network devices (not shown) included in the one or more communication service provider networks 106. The one or more communication service provider networks 106 can comprise various types of disparate networks, including but not limited to: cellular networks, femto networks, picocell networks, microcell networks, internet protocol (IP) networks Wi-Fi service networks, broadband service network, enterprise networks, cloud-based networks, millimeter wave networks and the like. For example, in at least one implementation, system 100 can be or comprise a large-scale wireless communication network that spans various geographic areas. According to this implementation, the one or more communication service provider networks 106 can be or comprise the wireless communication network and/or various additional devices and components of the wireless communication network (e.g., additional network devices and cell, additional UEs, network server devices, etc.).

The network node 104 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also comprise wireless link components, such as but not limited to, line-of-sight (LOS) or non-LOS links which can comprise terrestrial air-interfaces or deep space links (e.g., satellite communication links for navigation). Backhaul links 108 can be implemented via a "transport network" in some embodiments. In another embodiment, network node 104 can be part of an integrated access and backhaul network. This may allow easier deployment of a dense network of self-backhauled 5G cells in a more integrated manner by building upon many of the control and data channels/procedures defined for providing access to UEs.

Wireless communication system 100 can employ various cellular systems, technologies, and modulation modes to facilitate wireless radio communications between devices (e.g., the UE 102 and the network node 104). While example embodiments might be described for 5G new radio (NR) systems, the embodiments can be applicable to any radio access technology (RAT) or multi-RAT system where the UE operates using multiple carriers, e.g., LTE FDD/TDD, GSM/GERAN, CDMA2000 etc.

For example, system 100 can operate in accordance with any 5G, next generation communication technology, or existing communication technologies, various examples of which are listed supra. In this regard, various features and functionalities of system 100 are applicable where the devices (e.g., the UEs 102 and the network device 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 100 can be configured to provide and employ 5G or subsequent generation wireless networking features and functionalities. 5G wireless communication networks are expected to fulfill the demand of exponentially increasing data traffic and to allow people and machines to enjoy gigabit data rates with virtually zero (e.g., single digit millisecond) latency. Compared to 4G, 5G supports more diverse traffic scenarios. For example, in addition to the various types of data communication between conventional UEs (e.g., phones, smartphones, tablets, PCs, televisions, internet enabled televisions, AR/VR head mounted displays (HMDs), etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of 5G networks can comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks can allow for: data rates of several tens of megabits per second should be supported for tens of thousands of users, 1 gigabit per second to be offered simultaneously to tens of workers on the same office floor, for example; several hundreds of thousands of simultaneous connections to be supported for massive sensor deployments; improved coverage, enhanced signaling efficiency; reduced latency compared to LTE.

The 5G access network can utilize higher frequencies (e.g., >6 GHz) to aid in increasing capacity. Currently, much of the millimeter wave (mmWave) spectrum, the band of spectrum between 30 GHz and 300 GHz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the 3GPP and has been in use (including with LTE), is a multi-antenna technique that can improve the spectral efficiency of transmissions, thereby significantly boosting the overall data carrying capacity of wireless systems. The use of MIMO techniques can improve mmWave communications and has been widely recognized as a potentially important component for access networks operating in higher frequencies. MIMO can be used for achieving diversity gain, spatial multiplexing gain and beamforming gain. For these reasons, MIMO systems are an important part of the 3rd and 4th generation wireless systems and are in use in 5G systems.

Figure 2:
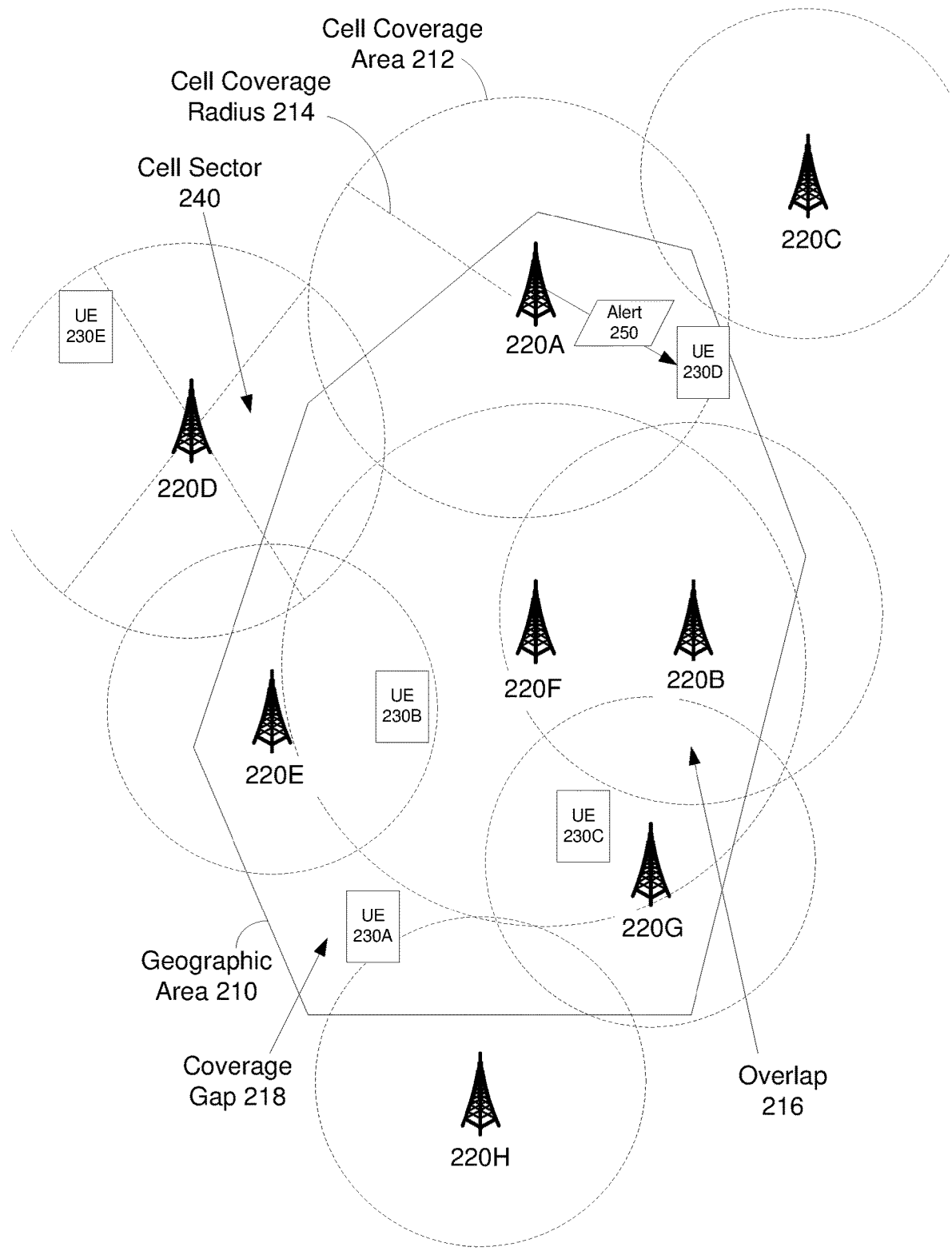
FIG. 2 illustrates an example geographic area and network nodes providing service therein, in accordance with various aspects and embodiments of the subject disclosure.

FIG. 2 illustrates an example geographic area and network nodes providing service therein, in accordance with various aspects and embodiments of the subject disclosure. FIG. 2 includes an example geographic area 210, and example network nodes 220A, 220B, 220C, 220D, 220E, 220F, 220G and 220H, each of which provides communication service within the geographic area 210. The network nodes 220A, 220B, 220C, 220D, 220E, 220F, 220G and 220H can be adapted to provide alerts, e.g., alert 250, to UEs connected to cells supported by the network nodes 220A, 220B, 220C, 220D, 220E, 220F, 220G and 220H, such as UEs 230A, 230B, 230C, 230D, and 230E.

Each of the network nodes 220A, 220B, 220C, 220D, 220E, 220F, 220G and 220H has a location within or surrounding the geographic area 210. Dashed circular lines illustrate example cell coverage areas associated with the network nodes 220A, 220B, 220C, 220D, 220E, 220F, 220G and 220H, such as the cell coverage area 212 associated with network node 220A. Each cell coverage area has a cell coverage radius, such as example cell coverage radius 214 associated with cell coverage area 212.

An example overlap 216 comprises an overlap of the cell coverage areas associated with network nodes 220B, 220F, and 220G. The example overlap 216 includes three overlapping cell coverage areas. FIG. 2 also illustrates areas within the geographic area 210, e.g., coverage gap 218, which are served by none of the network nodes 220A, 220B, 220C, 220D, 220E, 220F, 220G or 220H, and areas within the geographic area 210 which are served by one of the network nodes 220A, 220B, 220C, 220D, 220E, 220F, 220G or 220H, and areas within the geographic area 210 which are served by two of the network nodes 220A, 220B, 220C, 220D, 220E, 220F, 220G or 220H. The term "zero overlap" will be used herein to refer to areas such as coverage gap 218, served by none of the network nodes. A one layer overlap refers to an area served by one network node, a two layer overlap refers to an area served by two network nodes, etc. Using additional network nodes, any degree of overlapping coverage, e.g. 5, 10, or more layers of overlap are possible in some environments.

Figure 5:
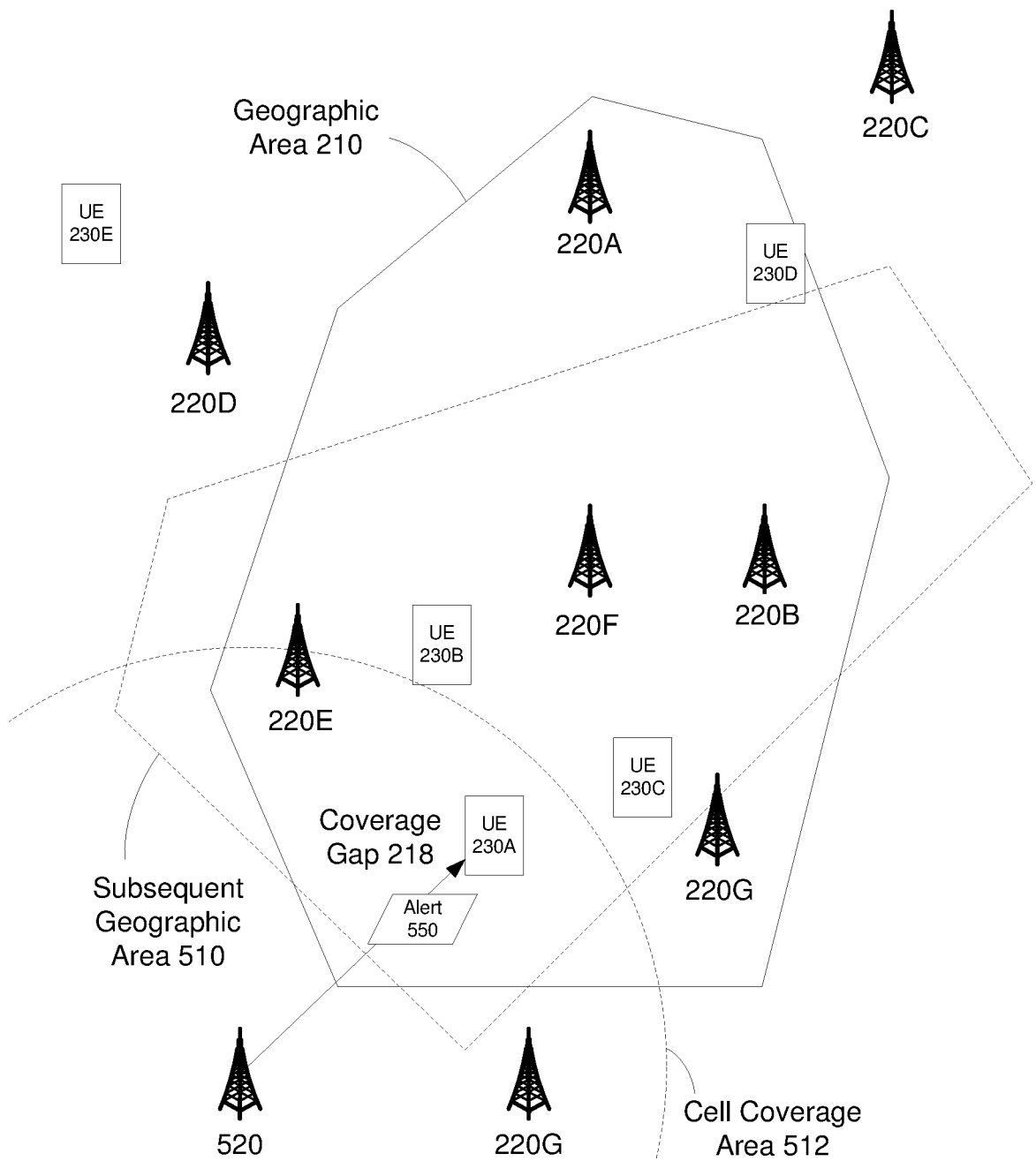
FIG. 5 illustrates a subsequent geographic area comprising the coverage gap introduced in FIG. 2, and an example additional network node that can be selected to address the coverage gap, in accordance with various aspects and embodiments of the subject disclosure.

The example coverage gap 218 comprises an area within geographic area 210 which is not served by any of the network nodes 220A, 220B, 220C, 220D, 220E, 220F, 220G and 220H. The UE 230A, located within coverage gap 218, may not receive the alert 250. Embodiments of this disclosure can attempt to select network nodes in manner that eliminates coverage gaps such as 218 within the geographic area 210. For example, if available, an additional network node can be selected to address the coverage gap 218, as illustrated in FIG. 5.

FIG. 2 furthermore illustrates an example cell sector 240 associated with network node 220D. Boundaries of cell sectors associated with network node 220D are indicated by the dashed lines that divide the cell coverage area of network node 220D. Cell sector 240 provides service within the geographic area 210, while other cell sectors supported by network node 220D do not provide service within the geographic area 210. Cell selection techniques described herein can comprise selecting cell sectors in a manner that supports a desired level of service (and corresponding ability to provide alerts 250) within the geographic area 210, while reducing service, and corresponding unwanted alerts, outside of the geographic area 210. For example, by selecting cell sector 240, and not the other illustrated sectors associated with network node 220D, embodiments can avoid providing alert 250 to UEs such as UE 230E, which is outside the geographic area 210 designated for the alert 250.

Figure 6:
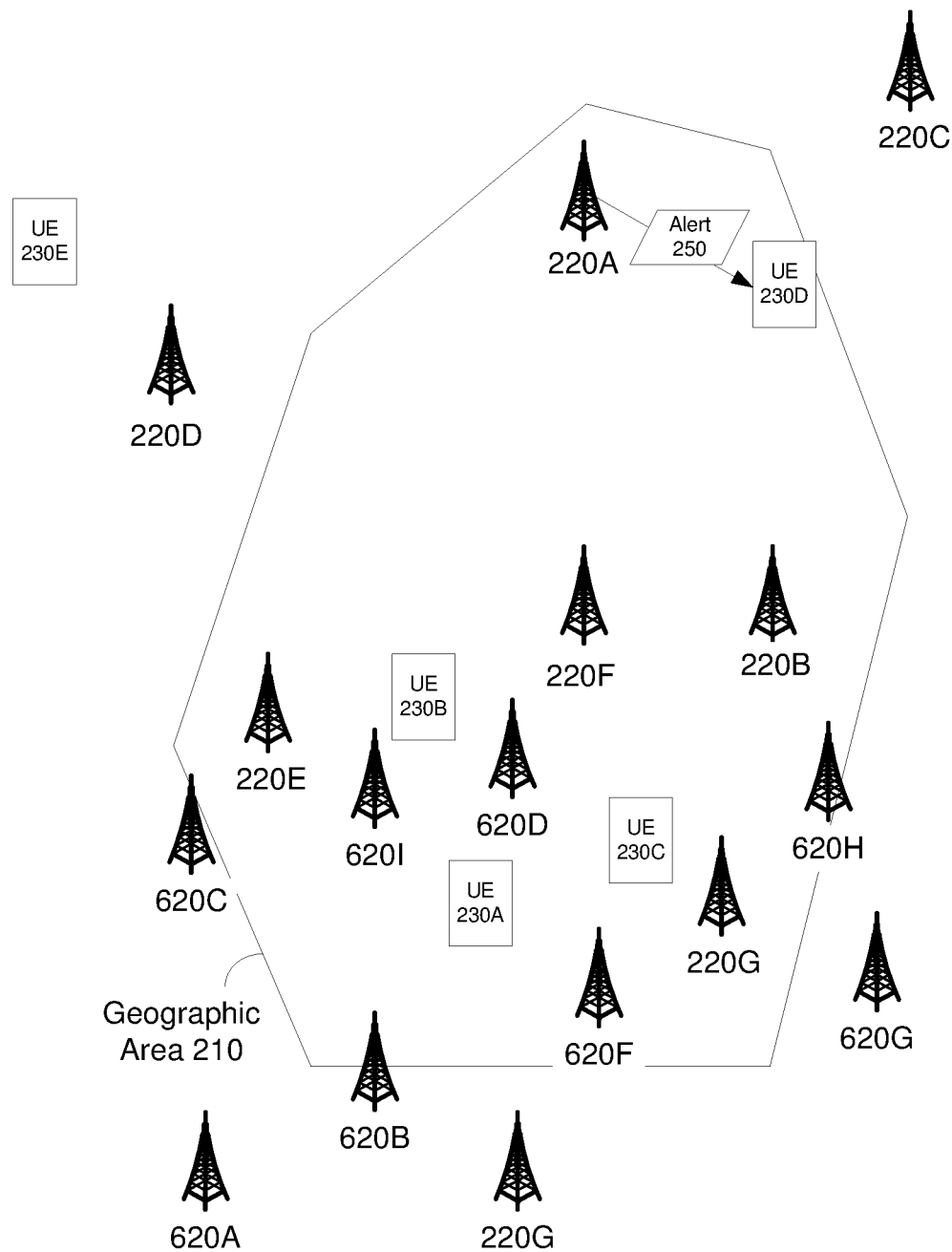
FIG. 6 illustrates the geographic area introduced in FIG. 2, and example additional network nodes that can provide a target overlap of cell coverage in the geographic area, in accordance with various aspects and embodiments of the subject disclosure.

The selection techniques described herein can be used to select a group of the network nodes 220A, 220B, 220C, 220D, 220E, 220F, 220G and 220H, and/or cells and cell sectors supported by the network nodes 220A, 220B, 220C, 220D, 220E, 220F, 220G and 220H, for use in sending an alert 250 to UEs 230A, 230B, 230C, and 230D within a geographic area 210. For example, network equipment of the communication service provider network(s) 106, introduced in FIG. 1, can be configured to receive geographic information that defines a geographic area for an alert, such as geographic area 210 for alert 250, and to use the received geographic information to select a group or subset of the network nodes 220A, 220B, 220C, 220D, 220E, 220F, 220G and 220H, and/or other network nodes such as illustrated in FIG. 5 and FIG. 6, for use in sending the alert 250.

In general, selection techniques described herein can comprise selecting network nodes 220A, 220B, 220C, 220D, 220E, 220F, 220G and 220H based on locations thereof and cell coverage radii 214/cell coverage areas 212 thereof, so as to ensure cell coverage within the geographic area 210, minimize coverage gaps 218 within the geographic area 210, and reduce coverage/alerts sent to UEs such as UE 230E which are outside the geographic area 210.

Selection techniques described herein can optionally also establish a target level of cell coverage overlap 216, e.g., one, two, three, or more layers of overlap, within the geographic area 210. Additional layers of overlap can increase likelihood that a higher number of UEs 230A, 230B, 230C, and 230D within the geographic area 210 will receive the alert 250. Techniques disclosed herein can calculate a target overlap for use in sending an alert 250, based on a desired level of confidence that UEs 230A, 230B, 230C, and 230D within the geographic area 210 will receive the alert 250. For example, when a desired level of confidence for an alert 250 is 90%, reflecting confidence that 90% of UEs 230A, 230B, 230C, and 230D within the geographic area 210 will receive the alert 250, a target overlap can be set at, e.g., two layers of overlap (or any corresponding calculated degree overlap) to ensure the desired 90% confidence. More overlap layers can be applied to increase confidence level, at the cost of decreasing the efficiency of the network and potentially sending more unwanted alerts to UEs such as UE 230E which are outside the geographic area 210. Conversely, fewer overlap layers can be applied to increase the efficiency of the network and send fewer unwanted alerts to UEs such as UE 230E which are outside the geographic area 210, while decreasing confidence level for UEs inside the geographic area 210. Example confidence levels for use in connection with embodiments disclosed herein can comprise, e.g., confidence levels in the range of 75.00% to 99.99%. Some embodiments may support the use of different confidence levels for different types of alerts.

Selection techniques described herein can optionally use measurements and reports from UEs 230A, 230B, 230C, 230D, and 230E, to assist in identifying coverage gaps such as coverage gap 218, cell coverage areas such as 212, and receipt of alerts such as 250 by UEs inside or outside of geographic areas 210. Received measurement and report information can be used to build a knowledge base or other data structure for a machine learning process adapted to perform network node selection.

In some embodiments, RAN and location based services (LBS) platforms can be used to implement the selection techniques disclosed herein, in order to achieve "coverage efficiency" to accurately measure the coverage of the geographic area 210 when wireless emergency alerts are distributed to UEs 230A, 230B, 230C, and 230D in the geographic area 210, and to achieve "smart coverage" to address/minimize the coverage gaps 218 by intelligently picking the right macro and small cells implemented by network nodes 220A, 220B, 220C, 220D, 220E, 220F, 220G and 220H, based on various factors such as antenna azimuth, sector angle, radius, and indoor versus outdoor locations of cell sites.

The disclosed solution can rely on UE level measurement data collected from the cell sites to determine the existing coverage radius of each cell. The cell radius coverage data aggregated with the alerts data can plotted on a map, with appropriate filter capabilities, so network engineers can determine the coverage efficiency of broadcasted wireless emergency alerts in the geographic area 210.

In some embodiments, when a coverage gap 218 is identified, the cell site data from the geographic area 210, and associated configurations can be aggregated and passed on to a machine learning model that can predict and propose antenna azimuths, sector angles, and radii for use at network nodes 220A, 220B, 220C, 220D, 220E, 220F, 220G and 220H. The locations of the cell sites can be considered, along with whether a cell site is indoors, cell configuration data, and cell site positioning such as whether the site is installed outside on a building structure or on a tower. 5G MIMO cells can be particularly affected by indoor locations.

Figure 3:
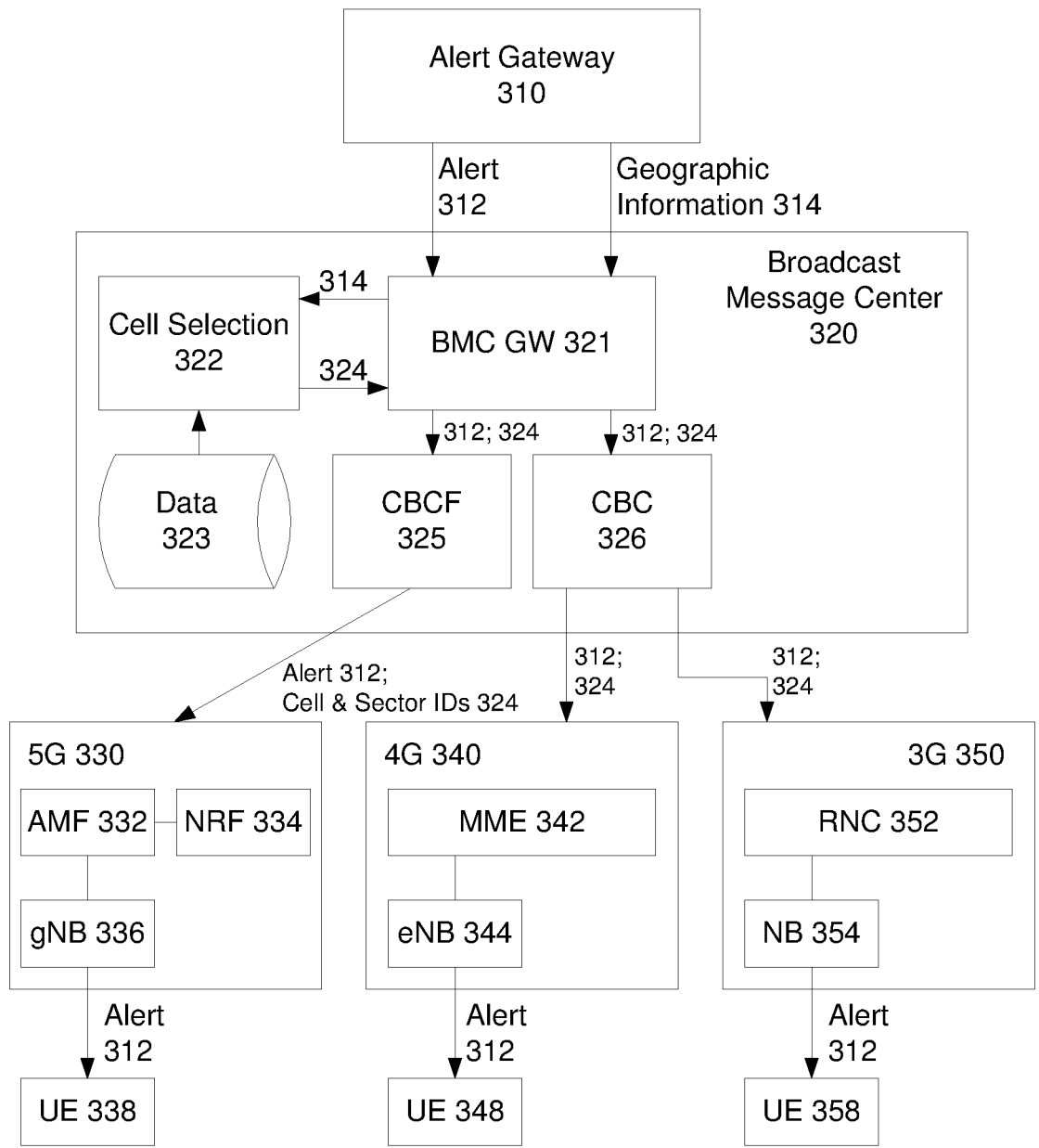
FIG. 3 illustrates an example broadcast message center adapted to select network nodes for use in connection with sending an alert to user equipment in a geographic area, in accordance with various aspects and embodiments of the subject disclosure.

FIG. 3 illustrates an example broadcast message center adapted to select network nodes for use in connection with sending an alert to user equipment in a geographic area, in accordance with various aspects and embodiments of the subject disclosure. FIG. 3 includes an alert gateway 310, a broadcast message center (BMC) 320, 5G network equipment 330, 4G network equipment 340, 3G network equipment 350, and UEs 338, 348, and 358. The BMC 320 includes a broadcast message center gateway (BMC GW) 321, cell selection 322 and data 323, a cell broadcast center function (CBCF) 325, and a cell broadcast service (CBS) 326. The 5G network equipment 330 includes an access and mobility management function (AMF) 332, a network repository function (NRF) 334, and gNB type network nodes such as gNB 336. The 4G network equipment 340 includes a mobility management entity (MME) 342, and eNB type network nodes such as eNB 344. The 3G network equipment 350 includes a radio network controller (RNC) 352, and NB type network nodes such as NB 354.

The BMC 320 can comprise network equipment of communication service provider network(s) 106, illustrated in FIG. 1. Furthermore, the gNB 336, eNB 344, and NM 354 can implement network nodes such as 104 in FIG. 1, or 220A, 220B, 220C, 220D, 220E, 220F, 220G and 220H in FIG. 2. The UEs 338, 348, and 358 can implement UEs 102 in FIG. 1, or UEs 230A, 230B, 230C, 230D, and 230E in FIG. 2.

In example operations according to FIG. 3, the alert gateway 310 can comprise equipment operated by a generator of alerts, such as FEMA, or law enforcement, or another government or commercial agency that generates alerts. The alert gateway 310 can supply an alert 312 and geographic information 314 to the BMC 320. The alert 312 can comprise alert information such as text describing the nature of the event that caused the alert, type of alert, expected duration of the alert condition, directions or recommended actions to respond to the alert 312, etc. The geographic information 314 can define a geographic area affected by the alert 312. The geographic information 314 can comprise, e.g., map coordinates for a geographic area boundary, or a designation of a known geographic area such as a city, county, or state.

The alert 312 and geographic information 314 can be received at the BMC GW 321. The BMC GW 321 can supply the geographic information 314 to cell selection 322. Cell selection 322 can be configured to select a group of cells and/or cell sectors for use in sending the alert 312 to UEs 338, 348, 358 in a geographic area defined by the geographic information 314. Cell selection 322 can use data 323 to make the selection of cells and cell sectors, wherein data 323 can comprise, e.g., cell locations, cell sector azimuths, cell coverage areas, cell coverage radii, and any other data such as indoor versus outdoor locations of cell sites, etc. The selected group of cells and/or cell sectors can be identified by cell and sector IDs 324. Cell selection 322 can be configured to output cell and sector IDs 324, e.g., to the BMC GW 321.

The BMC GW 321 can be configured to supply the alert 312 and the cell and sector IDs 324 to CBCF 325 and CBC 326, for distribution of the alert 312 and the cell and sector IDs 324 to the 5G equipment 330, 4G equipment 340, and 3G equipment 350. The 5G equipment 330 can send the alert 312 to gNB cells and sectors identified by cell and sector IDs 324, such as gNB 336, and the gNB 336 can send the alert 312 to all connected UEs, e.g. to UE 338. The 4G equipment 340 can send the alert 312 to eNB cells and sectors identified by cell and sector IDs 324, such as eNB 344, and the eNB 344 can send the alert 312 to all connected UEs, e.g. to UE 348. The 3G equipment 350 can send the alert 312 to NB cells and sectors identified by cell and sector IDs 324, such as NB 354, and the NB 354 can send the alert 312 to all connected UEs, e.g. to UE 358.

Figure 4:
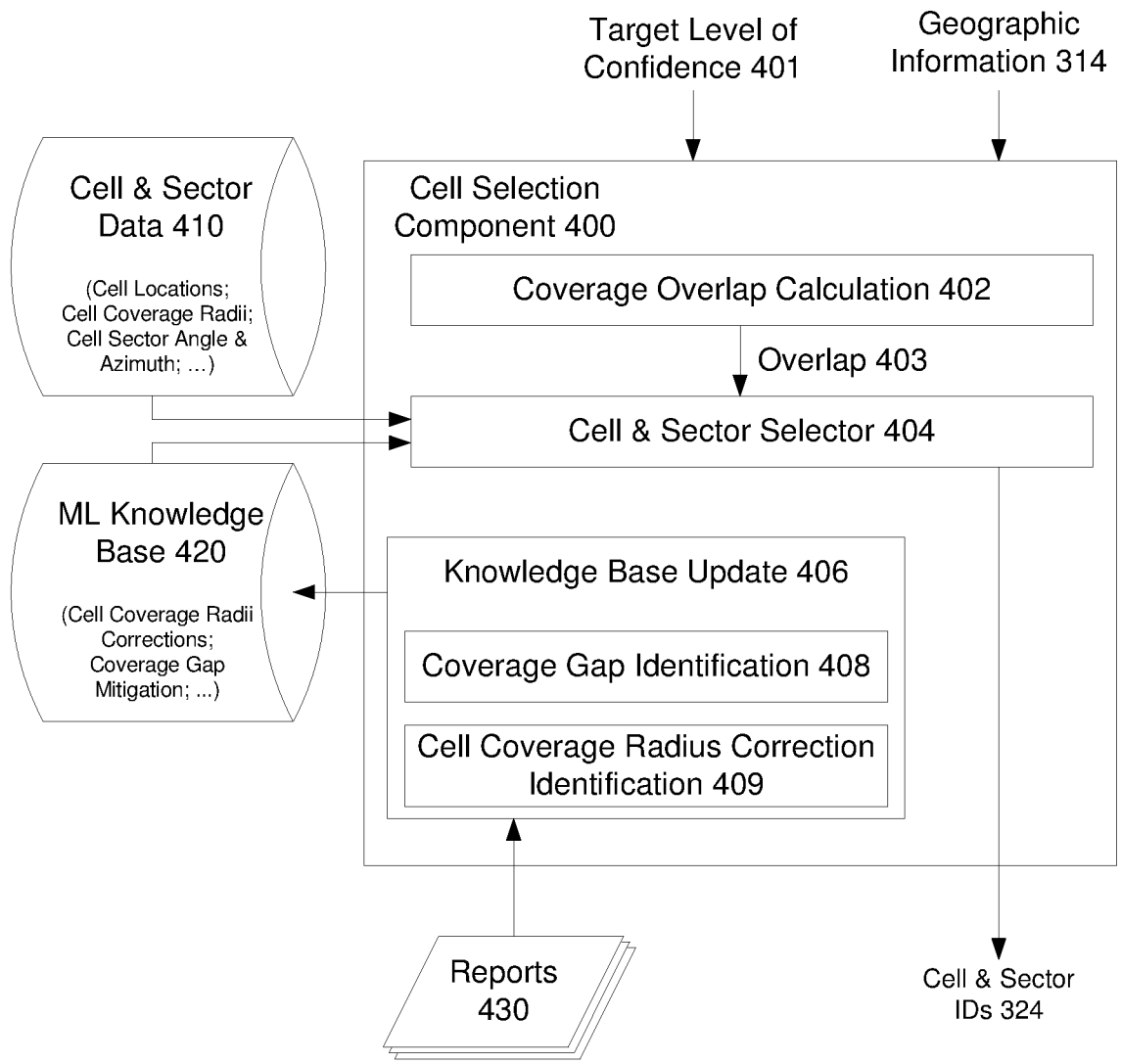
FIG. 4 illustrates an example cell selection component adapted to select network nodes for alerts, in accordance with various aspects and embodiments of the subject disclosure.

FIG. 4 illustrates an example cell selection component adapted to select network nodes for alerts, in accordance with various aspects and embodiments of the subject disclosure. The example cell selection component 400 can implement, e.g., cell selection 322 illustrated in FIG. 3. The example cell selection component 400 includes coverage overlap calculation 402, cell and sector selector 404, and knowledge base update 406. Knowledge base update 406 comprises coverage gap identification 408 and cell coverage radius correction identification 409. The cell and sector selector 404 can use data such as cell and sector data 410 and machine learning (ML) knowledge base 420, wherein cell and sector data 410 and ML knowledge base 420 can implement, e.g., the data 323 introduced in FIG. 3.

In example operations according to FIG. 4, the cell selection component 400 can receive geographic information 314, e.g., the geographic information 314 for an alert 312 introduced in FIG. 3. In some embodiments, the cell selection component 400 can furthermore receive a target level of confidence 401 associated with the alert 312, e.g., a target confidence that 90%, 95%, or some other proportion of UEs in the designated geographic area will receive the alert 312. The target level of confidence 401 can be included with the alert 312 and passed to the cell selection component 400, or the target level of confidence 401 can be supplied separately.

The coverage overlap calculation 402 can calculate a target overlap 403 based on the target level of confidence 401. For example, depending on the target level of confidence 401 for the alert 312, the coverage overlap calculation 402 can calculate that one overlap layer, two overlap layers, or more overlap layers are needed for the alert 312. The overlap 403 can indicate a target number of layers of overlapping coverage for the geographic area associated with the alert 312.

The cell and sector selector 404 can use the geographic information 314 and the overlap 403 to determine cell and sector IDs 324 for use with the alert 312. The cell and sector selector 404 can use cell and sector data 410 as well as ML knowledge base 420 to determine the cell and sector IDs 324. In some embodiments, the cell and sector selector 404 can use cell and sector data 410 such as cell locations (i.e. locations of network nodes), cell coverage radii, cell sector angle and azimuth, etc. to make an initial selection of cells and sectors, and the cell and sector selector 404 can refine its initial selection based on ML knowledge base 420, e.g., by adding additional cells and sectors to address coverage gaps, and refining cell coverage radii based on cell coverage radii corrections.

The knowledge base update 406 can be configured to receive reports 430 and update the ML knowledge base 420. The reports 430 can comprise, e.g., reports from UEs and/or network nodes. For example, UEs can report their locations as well as which cell/network node a UE is connected to, and such information can be used to make cell coverage radii corrections. In another example, UEs can report whether an alert was received, and such information can be used to identify coverage gaps. In some embodiments, reports 430 can be generated pursuant to an audit of coverage gaps for emergency alerts.

FIG. 5 illustrates a subsequent geographic area comprising the coverage gap introduced in FIG. 2, and an example additional network node that can be selected to address the coverage gap, in accordance with various aspects and embodiments of the subject disclosure. FIG. 5 illustrates the geographic area 210, the network nodes 220A, 220B, 220C, 220D, 220E, 220F, 220G and 220H, and the UEs 230A, 230B, 230C, 230D and 230E introduced in FIG. 2. Additionally, FIG. 5 includes a subsequent geographic area 510, a network node 520 and a cell coverage area 512 associated with the network node 520. The cell coverage area 512 provides coverage in the coverage gap 218. A subsequent alert 550 can comprise, e.g., an alert which is sent subsequent to sending alert 250, and the subsequent alert 550 can be applicable to the subsequent geographic area 510.

Using the selection techniques disclosed herein, a cell supported by network node 520, or cell sectors thereof, can be included in a selection of cells and cell sectors used for alert 550. By selecting the cell supported by network node 520, embodiments can address/close the coverage gap 218 by providing service within the coverage gap 218, so that a UE 230A in the coverage gap 218 is more likely to receive the alert 550.

In an example, the coverage gap 218 may be identified by a report 430 from the UE 230A, e.g., after sending the alert 250 via a selection of network nodes from among the nodes illustrated in FIG. 2. In a further aspect, the cell coverage radius of cell coverage area 512 may be identified in part by measurement data reported by a UE at the location of UE 230A. The coverage gap 218 and cell coverage radius of cell coverage area 512 can be included in an ML knowledge base such as 420, for use in sending subsequent alerts, such as alert 550, to subsequent geographic areas, such as 510, that comprise the coverage gap 218

FIG. 6 illustrates the geographic area introduced in FIG. 2, and example additional network nodes that can provide a target overlap of cell coverage in the geographic area, in accordance with various aspects and embodiments of the subject disclosure. FIG. 6 illustrates the geographic area 210, the network nodes 220A, 220B, 220C, 220D, 220E, 220F, 220G and 220H, and the UEs 230A, 230B, 230C, 230D and 230E introduced in FIG. 2. Additionally, FIG. 6 includes additional network nodes 620A, 620B, 620C, 620D, 620E, 620F, 620G, 620H, and 620I. The additional network nodes 620A, 620B, 620C, 620D, 620E, 620F, 620G, 620H, and 620I can optionally also provide communication service within the geographic area 210, although the cell coverage areas of network nodes are not illustrated in FIG. 6 in order to simplify the illustration.

In FIG. 6, additional network nodes 620A, 620B, 620C, 620D, 620E, 620F, 620G, 620H, and 620I can potentially enable more than a target level of service overlap within at least the bottom (southern) portion of geographic area 210. Sending the alert 250 by all of the network nodes 220A, 220B, 220C, 220D, 220E, 220F, 220G and 220H as well as all of the additional network nodes 620A, 620B, 620C, 620D, 620E, 620F, 620G, 620H, and 620I may be both unnecessary and detrimental, by placing unnecessary load on network nodes which do not need to be included in a node selection.

In a scenario such as FIG. 6, a group of network nodes selected for the alert 250 can comprise fewer than all of the network nodes that provide service within the geographic area 210. Cells and cell sectors of network nodes can optionally be selected to achieve a target level of cellular coverage overlap throughout the geographic area 210. In some embodiments, a uniform target level of service overlap, e.g., 3 layers of overlap, or some other number of service overlap, can be pursued throughout the geographic area 210. Of course, as can be observed in FIG. 2, the target level of service overlap can be exceeded in some locations and may not be achieved at other locations. Nonetheless, cells and cell sectors can be selected in a manner that approximates the target level of overlap throughout the geographic area 210, as well as guarantees at least some coverage throughout the geographic area 210.

Figure 7:
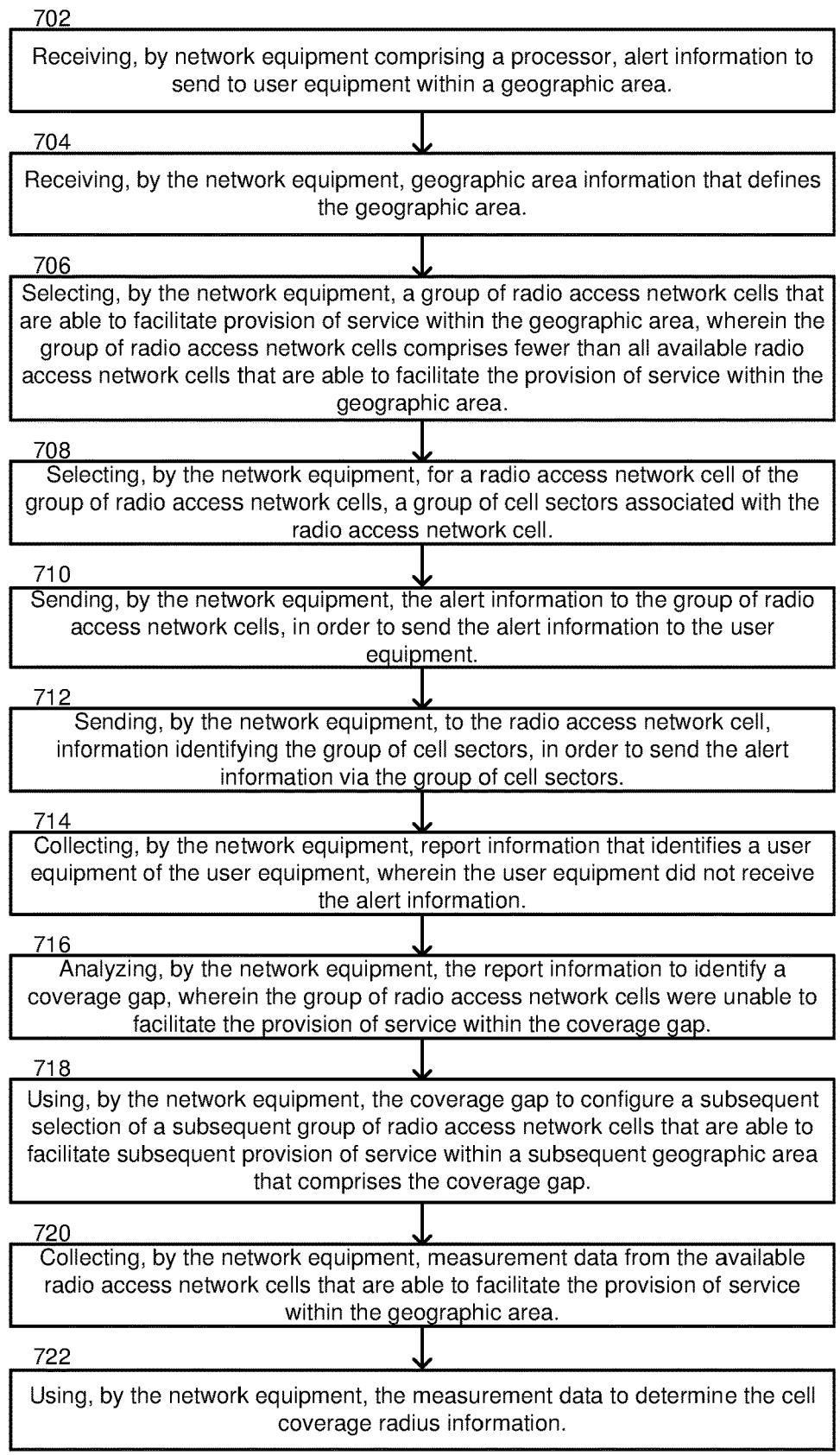
FIG. 7 is a flow diagram representing example operations of network equipment in connection selecting radio access network cells for an alert, in accordance with various aspects and embodiments of the subject disclosure.

FIG. 7 is a flow diagram representing example operations of network equipment in connection selecting radio access network cells for an alert, in accordance with various aspects and embodiments of the subject disclosure. The illustrated blocks can represent actions performed in a method, functional components of a computing device, or instructions implemented in a machine-readable storage medium executable by a processor. While the operations are illustrated in an example sequence, the operations can be eliminated, combined, or re-ordered in some embodiments.

The operations illustrated in FIG. 7 can be performed, for example, by network equipment in communication service provider network(s) 106, e.g. network equipment configured to operate as a broadcast message center 320 such as illustrated in FIG. 3. Example operation 702 comprises receiving, by network equipment 320 comprising a processor, alert information 312 to send to user equipment, e.g. UE 338, UE 348, and UE 358 within a geographic area, such as the geographic area 210 illustrated in FIG. 2. Example operation 704 comprises receiving, by the network equipment 320, geographic area information 314 that defines the geographic area 210.

Example operation 706 comprises selecting, by the network equipment 320, a group of radio access network cells, e.g. cells implemented by network nodes 220A, 220B, 220C, 220D, 220E, 220F, 220G and/or 220H, that are able to facilitate provision of service within the geographic area 210, wherein the group of radio access network cells comprises fewer than all available radio access network cells that are able to facilitate the provision of service within the geographic area 210. Example operation 708 comprises selecting, by the network equipment 320, for a radio access network cell, e.g., a cell at network node 220D of the group of radio access network cells, a group of cell sectors, such as cell sector 240, associated with the radio access network cell (at network node 220D).

In some embodiments, selecting the group of radio access network cells at operation 706 can be based on a target level of confidence 401 associated with the alert information 312, and the target level of confidence 401 can relate to a likelihood that the user equipment in geographic area 210 is able to receive the alert information 312. Selecting the group of radio access network cells can be based on the target level of confidence 401 by using the target level of confidence 401 to define a target overlap 403 of cell coverage provided by the group of radio access network cells.

In some embodiments, selecting the group of radio access network cells can comprise using a machine learning model enabled by machine learning applied to data representative of, e.g., the geographic area information 314, cell location information (e.g. locations of network nodes 220A, 220B, 220C, 220D, 220E, 220F, 220G and/or 220H), cell coverage radius information, or other information as described herein. In some embodiments, selecting the group of radio access network cells can comprise using cell location information and cell coverage radius information to select the group of radio access network cells.

Example operation 710 comprises sending, by the network equipment 320, the alert information 312 to the group of radio access network cells (the cells selected at operation 706), in order to send the alert information 312 to the user equipment, e.g., to the UEs in the geographic area 210. Example operation 712 comprises sending, by the network equipment 320, to the radio access network cell 220D, information identifying the group of cell sectors (from operation 708), in order to send the alert information 312 via the group of cell sectors.

Operations 714, 716, and 718 are directed to closing coverage gaps. Example operation 714 comprises collecting, by the network equipment 320, report information 430 that identifies a user equipment of the user equipment, e.g., user equipment 230A, wherein the user equipment 230A did not receive the alert information 312. Example operation 716 comprises analyzing, by the network equipment 320, the report information 430 to identify a coverage gap 218, wherein the group of radio access network cells (selected at operation 706) were unable to facilitate the provision of service within the coverage gap 218. Example operation 718 comprises using, by the network equipment 320, the coverage gap 218 to configure a subsequent selection of a subsequent group of radio access network cells (e.g., a group comprising a cell enabled by network node 520) that are able to facilitate subsequent provision of service within a subsequent geographic area 510 that comprises the coverage gap 218.

Operations 720 and 722 are directed to updated cell coverage radius information using measurements collected from UEs and/or network nodes. Example operation 720 comprises collecting, by the network equipment 320, measurement data (e.g., as may be included in reports 430) from the available radio access network cells 220A, 220B, 220C, 220D, 220E, 220F, 220G and 220H that are able to facilitate the provision of service within the geographic area 210. Example operation 722 comprises using, by the network equipment 320, the measurement data in reports 430 to determine the cell coverage radius information.

Figure 8:
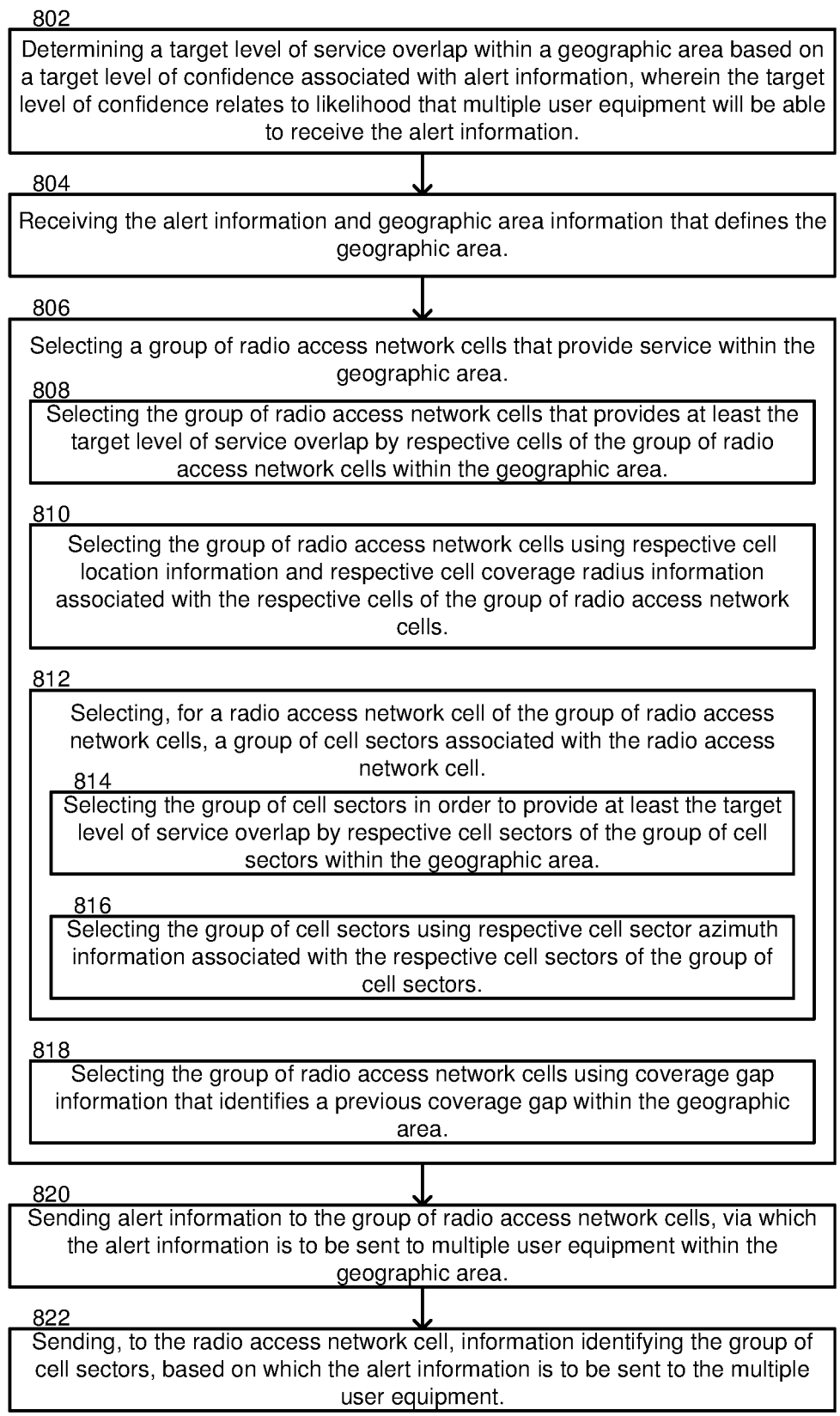
FIG. 8 is a flow diagram representing example operations of network equipment in connection with selecting radio access network cells for an alert in a manner that provides at least a target level of service overlap, in accordance with various aspects and embodiments of the subject disclosure.

FIG. 8 is a flow diagram representing example operations of network equipment in connection with selecting radio access network cells for an alert in a manner that provides at least a target level of service overlap, in accordance with various aspects and embodiments of the subject disclosure. The illustrated blocks can represent actions performed in a method, functional components of a computing device, or instructions implemented in a machine-readable storage medium executable by a processor. While the operations are illustrated in an example sequence, the operations can be eliminated, combined, or re-ordered in some embodiments.

The operations illustrated in FIG. 8 can be performed, for example, by network equipment in communication service provider network(s) 106, e.g. network equipment configured to operate as a broadcast message center 320 such as illustrated in FIG. 3. Example operation 802 comprises determining a target level of service overlap 403 within a geographic area 210 based on a target level of confidence 401 associated with alert information 312, wherein the target level of confidence 401 relates to likelihood that multiple user equipment 230A, 230B, 230C, and 230D will be able to receive the alert information 312. The target level of service overlap 403 within the geographic area 210 can comprise a target uniform level of service overlap over different subareas of the geographic area 210, e.g., a target uniform level of service overlap over north, south, east and west subareas of the geographic area 210. Alternatively, different target overlaps can be defined for different subareas.

Example operation 804 comprises receiving the alert information 312 and geographic area information 314 that defines the geographic area 210. Cell selection and sending of alert information 312, pursuant to operations 806, 820, and 822, can be in response to operation 804.

Example operation 806 comprises selecting a group of radio access network cells (e.g. a group of cells enabled by network nodes 220A, 220B, 220C, 220D, 220E, 220F, 220G and 220H) that provide service within the geographic area 210. Example operation 806 can comprise, e.g. operations 808, 810, 812 and 818. Example operation 808 comprises selecting the group of radio access network cells that provides at least the target level of service overlap 403 by respective cells of the group of radio access network cells within the geographic area 210. Example operation 810 comprises selecting the group of radio access network cells using respective cell location information (e.g. locations of network nodes) and respective cell coverage radius information, such as cell coverage radius 214, associated with the respective cells of the group of radio access network cells.

Example operation 812 comprises selecting, for a radio access network cell of the group of radio access network cells, e.g., for a cell at network node 220D, a group of cell sectors, such as cell sector 240, associated with the radio access network cell 220D. Operation 812 can comprise operations 814 and 816. Example operation 814 comprises selecting the group of cell sectors in order to provide at least the target level of service overlap 403 by respective cell sectors of the group of cell sectors within the geographic area 210. Example operation 816 comprises selecting the group of cell sectors using respective cell sector azimuth information associated with the respective cell sectors of the group of cell sectors.

Example operation 818 comprises selecting the group of radio access network cells using coverage gap information that identifies a previous coverage gap, e.g., coverage gap 218, within the geographic area 210.

Example operation 820 comprises sending alert information 312 to the group of radio access network cells (identified pursuant to operation 806), via which the alert information 312 is to be sent to multiple user equipment 230A, 230B, 230C, and 230D within the geographic area 210. Example operation 822 comprises sending, to the radio access network cell 220D of operation 812, information identifying the group of cell sectors, based on which the alert information 312 is to be sent to the multiple user equipment 230A, 230B, 230C, and 230D. Operations 820 and 822 can be combined in some embodiments in order to send the alert 312 to all selected cells and cell sectors.

Figure 9:
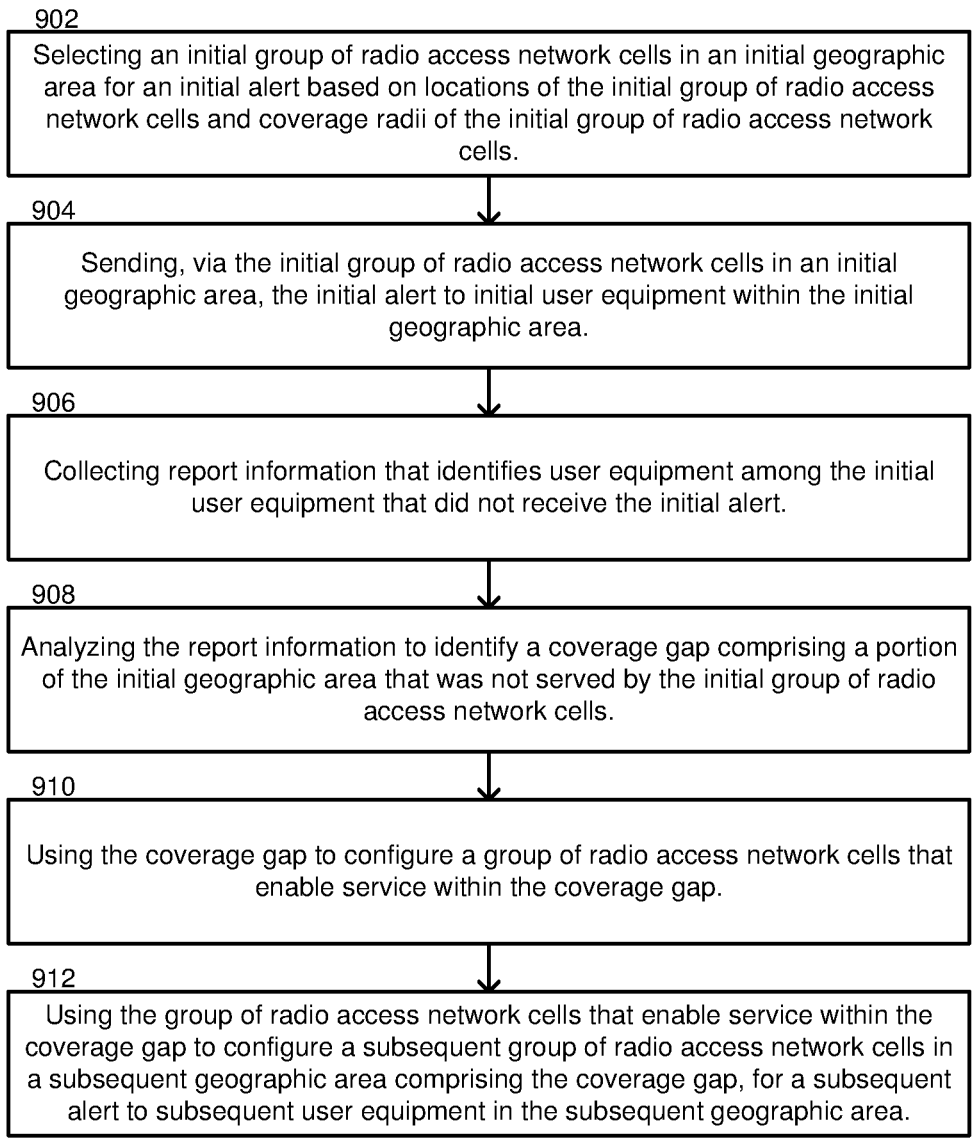
FIG. 9 is a flow diagram representing example operations of network equipment in connection with identifying and addressing coverage gaps for alerts, in accordance with various aspects and embodiments of the subject disclosure.

FIG. 9 is a flow diagram representing example operations of network equipment in connection with identifying and addressing coverage gaps for alerts, in accordance with various aspects and embodiments of the subject disclosure. The illustrated blocks can represent actions performed in a method, functional components of a computing device, or instructions implemented in a machine-readable storage medium executable by a processor. While the operations are illustrated in an example sequence, the operations can be eliminated, combined, or re-ordered in some embodiments.

The operations illustrated in FIG. 9 can be performed, for example, by network equipment in communication service provider network(s) 106, e.g. network equipment configured to operate as a broadcast message center 320 such as illustrated in FIG. 3. Example operation 902 comprises selecting an initial group of radio access network cells in an initial geographic area 210 for an initial alert 250 based on locations of the initial group of radio access network cells and coverage radii of the initial group of radio access network cells. Selecting the initial group of radio access network cells can be performed in order to enable at least a target level of service 401 throughout the initial geographic area 210.

Example operation 904 comprises sending, via the initial group of radio access network cells in an initial geographic area 210, the initial alert 250 to initial user equipment 230A, 230B, 230C, and 230D within the initial geographic area 210. Sending the initial alert 250 to the initial user equipment 230A, 2230B, 230C, and 230D within the initial geographic area 210 can be in response to receiving the initial alert 250 and initial geographic area information (e.g., 314) that defines the initial geographic area 210.

Example operation 906 comprises collecting report information 430 that identifies user equipment, e.g. UE 230A, among the initial user equipment 230A, 230B, 230C, and 230D that did not receive the initial alert 250. Example operation 908 comprises analyzing the report information 430 to identify a coverage gap 218 comprising a portion of the initial geographic area 210 that was not served by the initial group of radio access network cells. Example operation 910 comprises using the coverage gap 218 to configure a group of radio access network cells, e.g. a group comprising a cell at network node 520, that enable service within the coverage gap 218. Using the coverage gap 218 to configure the group of radio access network cells that enable service within the coverage gap 218 can comprise using the coverage gap 218 to configure a selection of cell sectors of the group of radio access network cells, wherein the cell sectors enable service within the coverage gap 218.

Example operation 912 comprises using the group of radio access network cells that enable service within the coverage gap 218 to configure a subsequent group of radio access network cells in a subsequent geographic area 510 comprising the coverage gap 218, for a subsequent alert 550 to subsequent user equipment in the subsequent geographic area 510.

Figure 10:
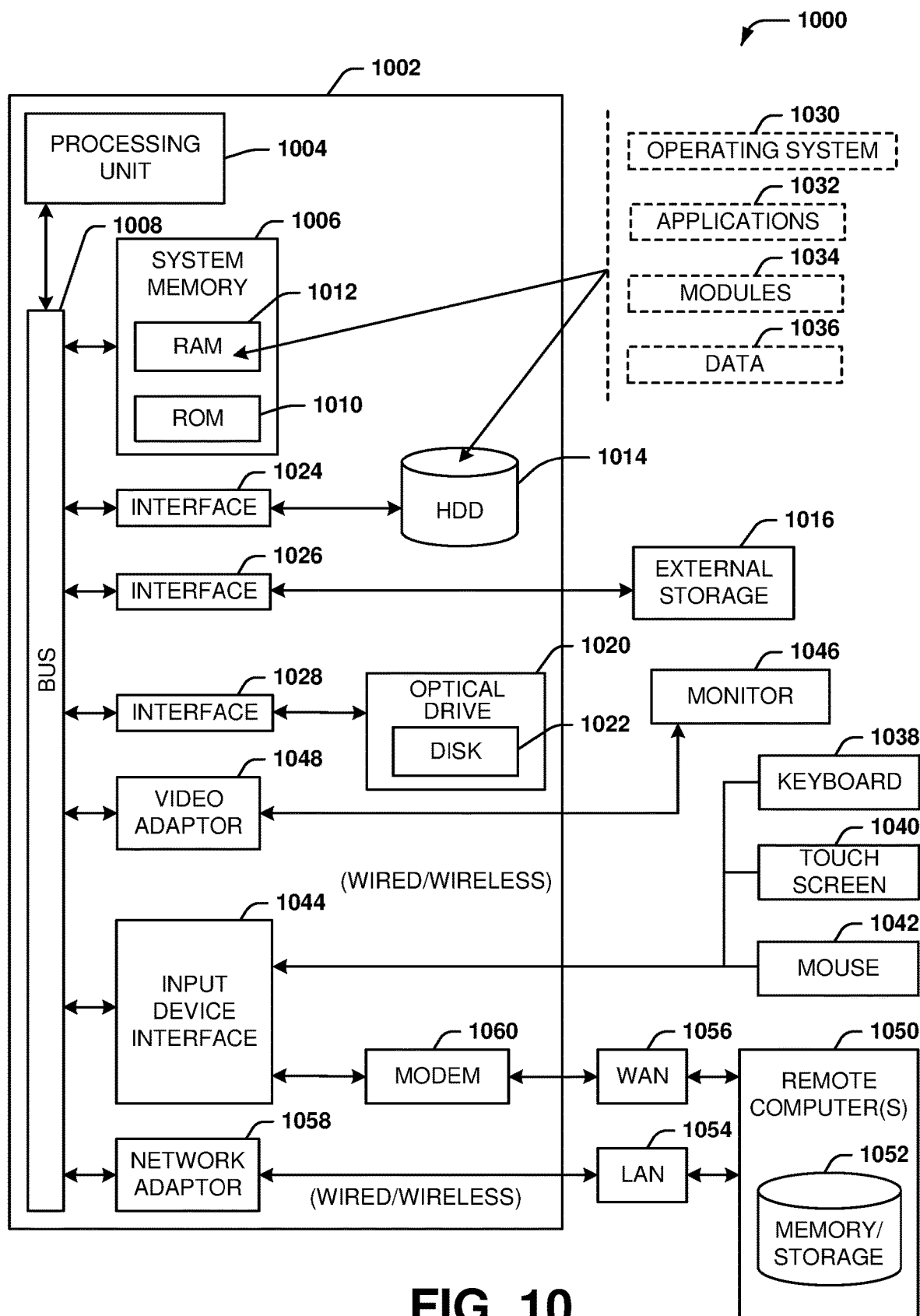
FIG. 10 is a block diagram of an example computer that can be operable to execute processes and methods in accordance with various aspects and embodiments of the subject disclosure.

FIG. 10 is a block diagram of an example computer that can be operable to execute processes and methods in accordance with various aspects and embodiments of the subject disclosure. The example computer can be adapted to implement, for example, any of the various network equipment described herein.

FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), smart card, flash memory (e.g., card, stick, key drive) or other memory technology, compact disk (CD), compact disk read only memory (CD-ROM), digital versatile disk (DVD), Blu-ray™ disc (BD) or other optical disk storage, floppy disk storage, hard disk storage, magnetic cassettes, magnetic strip(s), magnetic tape, magnetic disk storage or other magnetic storage devices, solid state drives or other solid state storage devices, a virtual device that emulates a storage device (e.g., any storage device listed herein), or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enabled with a security module, such as a trusted processing module (TPM). For instance with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art can recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
   receiving, by a network equipment comprising a processor, alert information to send to at least one user equipment within a geographic area;
   receiving, by the network equipment, geographic area information that defines the geographic area;
   selecting, by the network equipment, a group of radio access network cells that is able to facilitate a provision of service within the geographic area, wherein the group of radio access network cells comprises fewer than all available radio access network cells that are able to facilitate the provision of service within the geographic area;
   sending, by the network equipment, the alert information to the group of radio access network cells, in order to send the alert information to the at least one user equipment;
   collecting, by the network equipment, report information that identifies a first user equipment of the at least one user equipment, wherein the first user equipment did not receive the alert information;
   analyzing, by the network equipment, the report information to identify a coverage gap, wherein the group of radio access network cells were unable to facilitate the provision of service within the coverage gap; and
   using, by the network equipment, the coverage gap to configure a subsequent selection of a subsequent group of radio access network cells that is able to facilitate a subsequent provision of service within a subsequent geographic area that comprises the coverage gap.

2. The method of claim 1, further comprising:
   selecting, by the network equipment, for a radio access network cell of the group of radio access network cells, a group of cell sectors associated with the radio access network cell; and
   sending, by the network equipment, to the radio access network cell, information identifying the group of cell sectors, in order to send the alert information via the group of cell sectors.

3. The method of claim 1, wherein the selecting the group of radio access network cells is based on a target level of confidence associated with the alert information, and wherein the target level of confidence relates to a likelihood that the at least one user equipment is able to receive the alert information.

4. The method of claim 3, wherein the selecting the group of radio access network cells is based on the target level of confidence by using the target level of confidence to define a target overlap of cell coverage provided by the group of radio access network cells.

5. The method of claim 4, wherein the selecting the group of radio access network cells comprises using a machine learning model enabled by machine learning applied to data representative of the geographic area information, cell location information, and cell coverage radius information.

6. The method of claim 1, wherein the selecting the group of radio access network cells comprises using cell location information and cell coverage radius information to select the group of radio access network cells.

7. The method of claim 6, further comprising:

collecting, by the network equipment, measurement data from the available radio access network cells that are able to facilitate the provision of service within the geographic area; and using, by the network equipment, the measurement data to determine the cell coverage radius information.

8. The method of claim 1, wherein the network equipment is configured to operate as a broadcast message center.

9. Network equipment comprising:

a processor; and a memory that stores executable instructions that, when executed by the processor, facilitate performance of operations, the operations comprising:

receiving alert information to send to at least one user equipment within a geographic area;

receiving geographic area information that defines the geographic area;

selecting a group of radio access network cells that is able to facilitate a provision of service within the geographic area, wherein the group of radio access network cells comprises fewer than all available radio access network cells that are able to facilitate the provision of service within the geographic area;

sending the alert information to the group of radio access network cells, in order to send the alert information to the at least one user equipment;

collecting report information that identifies a first user equipment of the at least one user equipment, wherein the first user equipment did not receive the alert information;

analyzing the report information to identify a coverage gap, wherein the group of radio access network cells were unable to facilitate the provision of service within the coverage gap; and using the coverage gap to configure a subsequent selection of a subsequent group of radio access network cells that is able to facilitate a subsequent provision of service within a subsequent geographic area that comprises the coverage gap.

10. The network equipment of claim 9, the operations further comprising:

selecting for a radio access network cell of the group of radio access network cells, a group of cell sectors associated with the radio access network cell; and sending to the radio access network cell, information identifying the group of cell sectors, in order to send the alert information via the group of cell sectors.

11. The network equipment of claim 9, wherein the selecting the group of radio access network cells is based on a target level of confidence associated with the alert information, and wherein the target level of confidence relates to a likelihood that the at least one user equipment is able to receive the alert information.

12. The network equipment of claim 11, wherein the selecting the group of radio access network cells is based on the target level of confidence by using the target level of confidence to define a target overlap of cell coverage provided by the group of radio access network cells.

13. The network equipment of claim 12, wherein the selecting the group of radio access network cells comprises using a machine learning model enabled by machine learning applied to data representative of the geographic area information, cell location information, and cell coverage radius information.

14. The network equipment of claim 9, wherein the selecting the group of radio access network cells comprises using cell location information and cell coverage radius information to select the group of radio access network cells.

15. The network equipment of claim 14, the operations further comprising:

collecting measurement data from the available radio access network cells that are able to facilitate the provision of service within the geographic area; and using the measurement data to determine the cell coverage radius information.

16. The network equipment of claim 9, wherein the network equipment is configured to operate as a broadcast message center.

17. A non-transitory machine-readable medium, comprising executable instructions that, when executed by a processor, facilitate performance of operations, the operations comprising:

receiving alert information to send to at least one user equipment within a geographic area;

receiving geographic area information that defines the geographic area;

selecting a group of radio access network cells that is able to facilitate a provision of service within the geographic area, wherein the group of radio access network cells comprises fewer than all available radio access network cells that are able to facilitate the provision of service within the geographic area;

sending the alert information to the group of radio access network cells, in order to send the alert information to the at least one user equipment;

collecting report information that identifies a first user equipment of the at least one user equipment, wherein the first user equipment did not receive the alert information;

analyzing the report information to identify a coverage gap, wherein the group of radio access network cells were unable to facilitate the provision of service within the coverage gap; and using the coverage gap to configure a subsequent selection of a subsequent group of radio access network cells that is able to facilitate a subsequent provision of service within a subsequent geographic area that comprises the coverage gap.

18. The non-transitory machine-readable medium of claim 17, the operations further comprising:

selecting for a radio access network cell of the group of radio access network cells, a group of cell sectors associated with the radio access network cell; and sending to the radio access network cell, information identifying the group of cell sectors, in order to send the alert information via the group of cell sectors.

19. The non-transitory machine-readable medium of claim 17, wherein the selecting the group of radio access network cells is based on a target level of confidence associated with the alert information, and wherein the target level of confidence relates to a likelihood that the at least one user equipment is able to receive the alert information.

20. The non-transitory machine-readable medium of claim 19, wherein the selecting the group of radio access network cells is based on the target level of confidence by using the target level of confidence to define a target overlap of cell coverage provided by the group of radio access network cells.

* * * * *